United States Patent [19]

Holle et al.

[11] 4,117,325
[45] Sep. 26, 1978

[54] OPTICAL OBJECTIVE FOCUS INDICATOR AND DISPLAY

[75] Inventors: Werner Holle, Wetzlar; Walter Bletz, Braunfels, both of Germany

[73] Assignee: Ernst Leitz Wetzlar GmbH, Wetzlar, Germany

[21] Appl. No.: 845,666

[22] Filed: Oct. 26, 1977

Related U.S. Application Data

[63] Continuation of Ser. No. 711,462, Aug. 5, 1976, abandoned.

[30] Foreign Application Priority Data

Aug. 22, 1975 [DE] Fed. Rep. of Germany ....... 2537482

[51] Int. Cl.$^2$ .......................... H01J 39/12; G01J 1/42
[52] U.S. Cl. ...................... 250/209; 354/25; 354/60 L; 356/4; 356/227; 250/201; 250/204
[58] Field of Search ................ 250/201, 204, 209; 356/4, 125, 126, 227; 354/60 L, 25, 31

[56] References Cited

U.S. PATENT DOCUMENTS

| | | | |
|---|---|---|---|
| 1,145,348 | 7/1915 | Carter | 324/91 X |
| 2,007,935 | 7/1935 | Ruben | 324/91 X |
| 3,528,350 | 9/1970 | Schmitt | 250/209 X |
| 3,781,110 | 12/1973 | Leitz et al. | 356/4 |
| 3,783,270 | 1/1974 | Kamachi | 356/126 X |
| 3,955,892 | 5/1976 | Numata et al. | 354/60 L X |

Primary Examiner—Alfred E. Smith
Assistant Examiner—Charles F. Roberts
Attorney, Agent, or Firm—Gilbert L. Wells

[57] ABSTRACT

Apparatus for indicating and displaying the focus of an optical objective and particularly a photographic camera. An image of the object is projected by means of the objective onto a scanning disk or plate where the light rays are divided into two separate light beams originating from two different areas of the exit pupil of the objective. Two photoelectric detectors are provided behind said scanning disk with one of said light beams impinging on one detector. Each detector delivers an electrical signal, the phase difference between these signals being a measure of the degree of focus of the objective. For indicating said degree of focus two LED's (Light Emitting Diodes) are provided which are so coupled that for focus (phase difference = null) they are equally luminous and that for lack of focus they indicate the direction of the image offset from the focusing plane and approximately also the magnitude of this offset on account of their special coupling and their change in luminosity which is independent of object brightness.

1 Claim, 4 Drawing Figures

OPTICAL OBJECTIVE FOCUS INDICATOR AND DISPLAY

The present application is a continuation of application Ser. No. 711,462 filed Aug. 5, 1976 and now abandoned.

BACKGROUND OF THE INVENTION

The present invention relates to apparatus for indicating and displaying the focus of an objective, in particular that of a photographic camera.

It is known to the prior art, as regards focusing of objectives, to project an image of the object onto a scanning disk or plate located in one image plane of the objective. This disk or plate comprises a grating being moved normal to its grating lines. The light rays impinging on this grating are split into two separate light beams which originate from different areas of the exit pupil of the objective. Two photoelectric detectors are provided behind the scanning disk or plate, each of which delivers one electrical signal, the phase difference between the two signals representing a measure of the focus or lack of focus of the objective.

It is known to use a phase difference signal to control a servo motor displacing the objective by means of gearing into one direction or the other until the phase difference is null, that is, until the objective is focused on the object.

However, the objectives to be displaced frequently are fairly heavy, so that their displacement requires significant power and a strong motor is required, which in turn often is packaged only with difficulty in optical instruments. This is especially the case for camera objectives having long focal lengths.

The state of the art of scanning disks and gratings in combination with photoelectric detectors therebehind for measuring the focus of objectives may be ascertained by reference to U.S. Pat. Nos. 3,781,110 and 3,833,299 the disclosures of which are incorporated herein. The state of the art of the circuitry for auotomatic comparison of two beam photoelectric radiation may be ascertained by reference to U.S. Pat. No. 3,255,355, the disclosure of which is incorporated herein.

Having the above limitations in mind, it has been proposed therefore to make use of a simple control in lieu of a closed loop, that is, to provide semi-automatic focus instead of a fully automatic one, the objective being adjusted manually and a special focus indicator being provided.

Conceivably such a focusing display might be a simple measuring unit requiring displacing the objective until a given pointer position is reached. Such a measurement unit however will be disadvantageous if the light conditions for the object are poor, that is, when the object is fairly dark, because there would be difficulties in reading the pointer position.

SUMMARY OF THE INVENTION

Having the above in mind, it is an object of the present invention to have a focus display which would be largely independent of the object's brightness or illumination.

The present invention achieves this objective by providing a focus display consisting of a photo scale of two LEDs (Light Emitting Diodes) which are so powered as to be equally luminous for full focus (phase difference = 0). These LEDs because of their special circuitry ascertain the direction of the offset of the image from the focusing plane by their changes in luminosity independent of the object brightness when there is defocusing, and furthermore approximately also the amount of this offset.

Such a focusing display is independent of the object brightness whenever the luminosity of the LEDs of the photo scale depends only on the phase difference of the signals supplied by the photodetectors. If there is zero phase difference, both LEDs will be of an even and median luminosity. But if there is a phase difference, one of the LEDs will be brighter than the other, this difference in luminosity depending only on the phase difference and being independent of the object brightness.

However, in order to prevent any swamping of the view finder, it is desirable to adapt the median luminosity of the LEDs to the brightness of the view finder, that is, the LEDs are the more luminous the brighter the object, and the less luminous the lower the object brightness.

To make such allowance, it is further proposed to couple the two LEDs so that their median luminosity varies with object brightness.

When the display system of the present invention is used to indicate objective focus in a photographic camera, then preferably the two LEDs should be mounted approximately at the center of the view finder, and in particular so that they are visible at the edge of the part of the image field being evaluated.

BRIEF DESCRIPTION OF THE DRAWING

Further objects and features of the present invention may be ascertained by reference to the accompanying drawings wherein.

DESCRIPTION OF THE PREFERRED EMBODIMENTS

Figure 1:
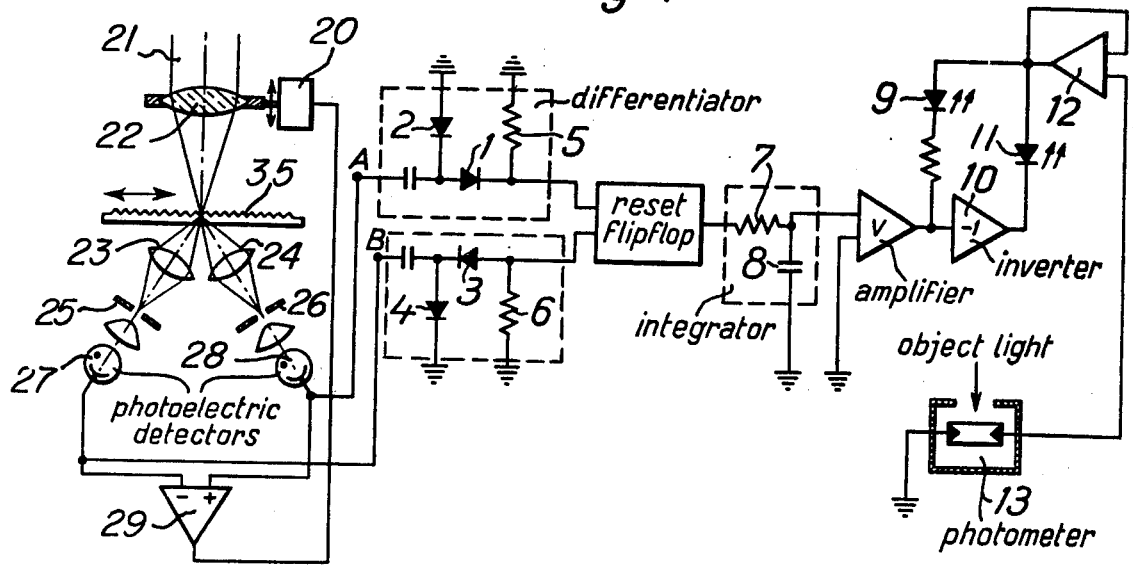
FIG. 1 is a schematic circuit drawing of one embodiment of the present invention.

The circuit shown in FIG. 1 is provided with two inputs A and B fed with square wave pulses from photoelectric detectors. These pulse trains are in phase for focus. Each input A and B is followed by a differentiator consisting of two diodes 1,2 and 3,4 and one resistance 5,6.

A reset flip-flop RSFF is connected to the outputs of the differentiators, its own output being connected to an integrator in the form of an RC-circuit 7,8. The integrator is followed by an amplifier V or high gain. The first LED 9 connects to the output of amplifier V, which is followed by an inverter 10, the output of the latter being connected to the second LED 11.

The other two terminals of LEDs 9 and 11 are jointly connected to the output of voltage follower 12 which is fed with its potential from photometer 13. The last part of the circuit, that is the voltage follower in combination with light or photometer 13 is used to adjust the median luminosity of LEDs 9 and 11 to the particular object brightness.

Reference numeral 21 designates a light bundle coming from an object to be measured. An objective 22 images the object in the plane of grating 35. As a result of the relative movement between the grating 35 and the image, which may be generated stochastically by movements or vibrations of the user of the rangefinder, a time-variable signal of maximum amplitude occurs at the output of the push-pull amplifier 29 in the condition of sharp focusing. Diaphragms 25 and 26 have here, in connection with the objectives 23 and 24, the purpose of defining the detection directions of the photoelectric detectors 27 and 28 in single valued manner so as to be unambiguous. The image sharpness is regulated by means of regulator 20 and objective 22.

Figure 2:
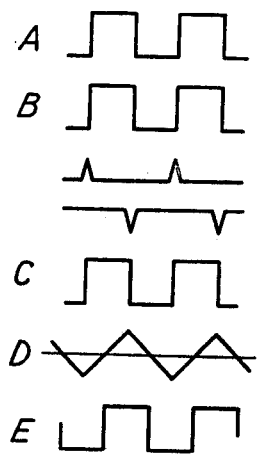
FIG. 2 is a graphical representation of the signal processing in the circuit of FIG. 1 when the object is in focus.

The circuit operates as follows:

The square wave pulses from the photodetectors are applied to inputs A and B, as shown in FIG. 2, for zero phase shift. Differentiation in differentiators 1,2,5 generates pulses from wave train A following transition into Plus, whereas pulses are generated from wave train B by means of differentiators 3,4,6 when transiting into Minus. These pulses control the reset flip-flop RSFF, which for the assumed phase difference of zero of FIG. 2 delivers at its output a square wave train C with a keying ratio of 1:1.

This square wave train is applied to the RC circuit 7,8 (= integrator), which delivers an output in the form of a saw tooth wave D which, for focus — that is, for zero phase difference between the square wave trains at inputs A and B evenly fluctuates about the null point. Amplifier V again shapes curve D into a square wave E of 1:1 keying ratio. In this manner both LEDs 9 and 11 are controlled, furthermore making use of inverter 10. Because of the 1:1 keying ratio of the square wave train E, the LEDs are equally luminous when focus has been obtained (i.e., when the phase difference between the square wave trains at inputs A and B is zero).

Figure 3:
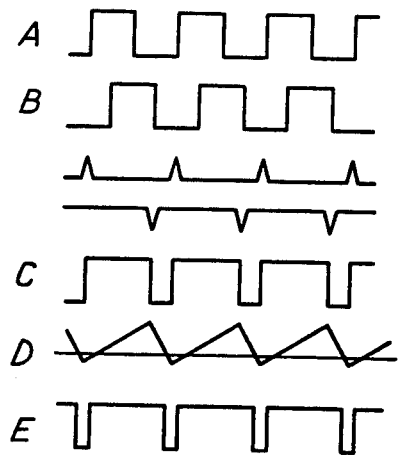
FIG. 3 is a graphical representation of the signal processing of FIG. 1 when the objective is out of focus.

FIG. 3 on the other hand shows the signal-time relationship for the objective out of focus. In this case there is phase difference between the square waves at inputs A and B, which is proportional to defocusing.

Therefore the pulses delivered by differentiators 1,2,5 and 3,4,6 are not equally spaced upon comparison of the two pulse trains. In turn this causes keying ratio deviating from 1:1 in the square wave C at the output of the reset flip-flop RSFF. Then saw-tooth wave D no longer evenly fluctuates about the null point, but is offset to one side, and the square wave E after amplifier V therefore also deviates from 1:1 in its keying ratio. The end result is that the currents applied to LEDs 9 and 11 are unequal and these LEDs are of unequal luminosities, thereby displaying lack of focus.

The combination of the RC circuit 7,8 and amplifier V allows increasing the keying ratio of wave train E with respect to C, that is, to increase the discrimination slope.

Figure 4:
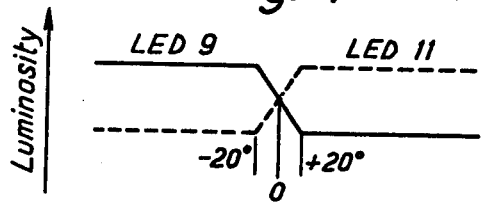
FIG. 4 is a graphical representation of the luminosity angle relationship of the two LEDs.

FIG. 4 shows the luminosity of the two LEDs 9 and 11 as a function of the phase difference between the two square waves applied at inputs A and B. It is seen that for zero phase difference, the two LEDs are equally luminous. If however there is minus phase difference, the luminosity of LED 11 decreases while that of LED 9 increases. A boundary value is reached for a phase difference of about $-20°$, beyond which LED 11 is completely dark while LED 9 shines at constant and maximum brightness. When the phase difference is Plus, mirror-image relationships are obtained, so that beyond a phase difference of about $+20°$, LED 9 is dark while LED 11 shines with maximum luminosity.

The photo or light meter denoted by 13 is assumed to deliver a potential increasing with illumination. The potential applied to the LED is so controlled by means of that potential passing through the voltage follower and when appropriate through non-linear resistances that the LEDs are less luminous for lesser ambient brightness.

We claim:

1. In an apparatus comprising an optical objective, a scanning disk or a scanning plate and first and second photoelectric detectors all located along optical axes for indicating the focus of said optical objective which projects an image of an object onto said scanning disk or scanning plate for pupil division of the image into imaging beams, and projection of said imaging beams onto said photoelectric detectors, each of which generates an electrical impulse where a phase difference between said pulses is a measure of the degree of said focus of the objective, the improvement comprising first and second differentiators connected respectively to said first and second photoelectric detectors, a reset flip-flop having first and second input terminals connected respectively to said first and second differentiators and an output terminal, an integrator connected to said output terminal, an amplifier connected to said integrator, a first and a second light emitting diode, said first light emitting diode connected to said amplifier and said second light emitting diode connected to an inverter connected to said amplifier, a voltage follower connected to said first and second light emitting diodes, and means for photoelectrically measuring the object brightness, said means connected to said voltage follower for adjusting the median luminosity of said light emitting diodes in dependence on the object brightness.

* * * * *